Feb. 26, 1929.
O. H. GOETZ
1,703,665
AUTOMOBILE BUMPER
Filed Oct. 5, 1925
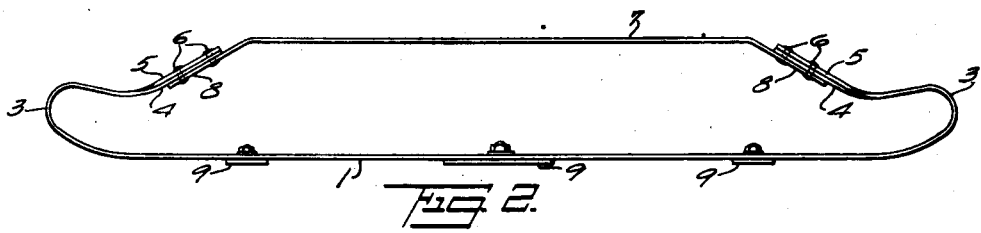
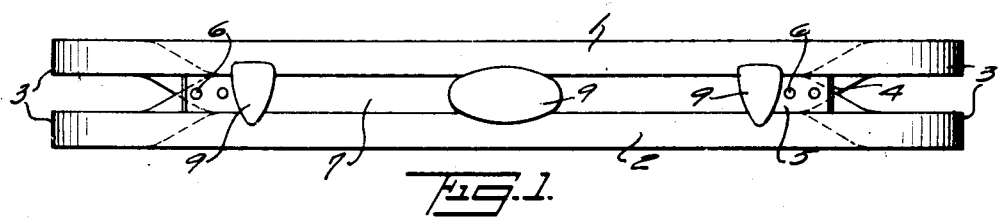
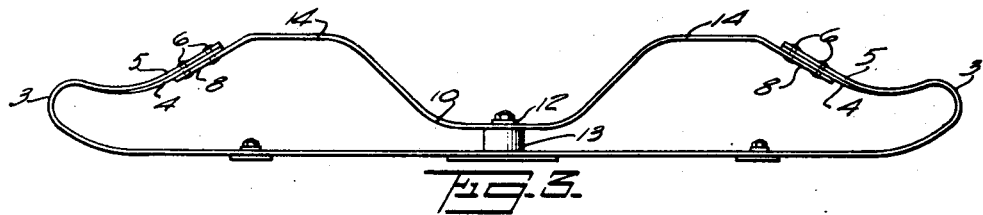
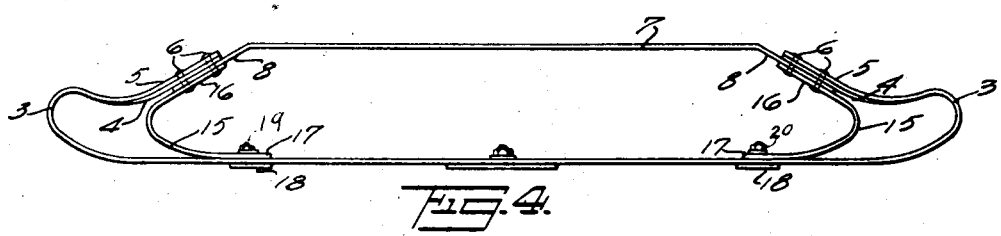
INVENTOR
Oscar H. Goetz
BY
ATTORNEY Patented Feb. 26, 1929.

1,703,665

UNITED STATES PATENT OFFICE.

OSCAR H. GOETZ, OF SPRINGFIELD, MASSACHUSETTS, ASSIGNOR TO AMERICAN CHAIN COMPANY, INC., A CORPORATION OF NEW YORK.

AUTOMOBILE BUMPER.

Application filed October 5, 1925. Serial No. 60,405.

This invention relates to automobile bumpers and has for an object the provision of a spring-bar-bumper comprising an impact section including a plurality of flat metal bars superimposed in the same vertical plane and spaced vertically, extending all the way across the front of the bumper and having their ends recurved to form individual end loops, the recurved ends of the component members being edge bent diagonally toward each other and meeting, near the loops, at a point where the ends are joined to each other and are also joined to the ends of a rear bar which extends for a considerable portion of its length in substantial parallelism with the impact bars, serving to connect the joints above mentioned and also being adapted to receive clamps or other attaching means by which the bumper structure in its entirety may be supported from a vehicle.

The bumper above described constitutes a shock absorbing structure notably efficient, possessing sufficient resiliency to absorb ordinary impacts without undue shock to the vehicle or its occupants, and at the same time affording sufficiently rigid structure to resist more violent impacts and provide for their complete absorption.

A further object of the invention is to provide a modified bumper of the above type in which means are provided to connect the rear bar and impact members at one or more points between the ends thereof, and such a connection may be provided either by bending forward the rear bar at its middle region and connecting the same with the impact section at a central region of the latter, or by providing a plurality of spacing or cushion members which are preferably interposed between the rear bar and the impact bars toward the ends of the impact section.

These cushion members are preferably secured both to the rear and to the impact bars, as for example, by clamps extending between and connecting the impact bars to each other and to one end of the cushion members, the other ends of the cushion members being desirably bolted or riveted to the ends of the recurved loop members and also to the ends of the rear bar, at the joints therebetween.

Such additional connections between the rear bar and the impact bars afford additional rigidity at regions where impacts of unusual violence may be expected in use, and either the central form of connection or that embodying cushions at the ends, or both, may be provided, in accordance with the service demanded by the particular installation in which the bumper of the improved type herein disclosed is to be employed.

Other features of the invention will appear from the subjoined specification and claims and are illustrated in the drawings.

In the drawings,

Fig. 1 is a view in front elevation of an automobile bumper in the construction of which the invention has been embodied.

Fig. 2 is a plan view thereof.

Fig. 3 is a plan view of a modified bumper of the general type shown in Figs. 1 and 2.

Fig. 4 is a plan view of another modification.

In the illustrated embodiment, referring to Figs. 1 and 2, the reference numerals 1 and 2 designate upper and lower impact bars, preferably formed of flat resilient strips of steel arranged in the same vertical plane and spaced vertically, substantially as illustrated, these bars extending throughout the entire length of the bumper, and constituting an impact section at the ends of which the bars 1 and 2 are recurved to form separate loops 3 preferably lying each in the horizontal plane of its particular impact member, and beyond these loops the end portions 4 and 5 of the members 1 and 2 are shown as edge-bent diagonally toward each other, joining at a region near the ends of the loops, where they are secured together as indicated at 6, by suitable devices such as rivets or bolts.

In pursuance of the invention a rear bar is shown at 7 extending in substantial parallelism with the impact section and spaced therefrom throughout the greater, or a lesser, portion of its length, as may be desired, the form of rear bar illustrated in Figs. 1 and 2 being parallel with, and spaced from, the impact section, for substantially the entire length of the rear bar, and each end of the rear bar is bent forward as at 8 into substantial parallelism with the diagonally bent end members 4 and 5, to which the end portions 8 of the rear bar are preferably secured, as for example by the same bolts and rivets 6 which connect the impact bars to each other, so that a single joint suffices to complete the bumper structure at these regions.

The impact members are desirably connected to each other also by clamps 9 which also serve as means to maintain the vertically spaced relation of the impact members.

The bumper may be attached to a vehicle by any suitable devices, not shown, these devices being customarily attached to the rear bar 7 at points between the center and ends thereof on each side of the center.

In a modification of the above described bumper, which modification is shown in Fig. 3, the impact members are arranged and joined similarly to those above described, and bear the same reference numbers for corresponding parts, the description of which need not be duplicated.

The modification consists in forming the rear bar with a forwardly projecting middle portion 10 which extends toward the central portion of the impact section and is secured thereto by any suitable means, such as the central clamping bolt 12, and also with a spacing block 13 if it is desired to maintain the rear bar at an appreciable distance from the rear of the impact bars, although the portion 10 may engage the rear of the impact bars.

The rear bar preferably is formed with attaching portions 14 substantially parallel with the impact section and spaced therefrom, and this form of structure may be used to advantage where shock-absorbing service of a more rigid character is to be rendered by the bumper.

In Fig. 4 is shown still another modification in which the impact members and rear bar are of identical structure, preferably, with the parts bearing the same numbers shown in Figs. 1 and 2, the modification in this form of bumper residing in the provision of a spacing member or flexible cushion 15 near each loop 3, and preferably interposed between the impact section and rear bar at the region of the joint 6 on each side, the member 15 having one of its ends secured to the recurved loop ends 4 and 5 by the same rivets or bolts 6 which connect the ends 4 and 5 with the ends 8 of the rear bar, the ends 8 being embraced between the end portion 16 of the member 15 and the loop end portions 4 and 5.

The forward ends 17 of the members 15 extend toward, and are preferably secured to, the impact section, as by means of clamps 18 which connect the top and bottom impact bars to each other and which are connected in turn to the portion 17 of the members 15 by bolts 19 and nuts 20.

In this latter modification a somewhat greater rigidity, of a yielding character however, is provided in the vicinity of each of the end loops 3, and this type of structure is particularly serviceable where heavy impacts are to be guarded against, proceeding toward the ends of the bumper.

Having described my invention, I claim:—

1. A bumper comprising a rear bar, and an impact section including a plurality of vertically spaced parallel front bars extending throughout the length of the bumper and recurved to form individual end loops connected to each other and to the rear bar by diagonal members, said rear bar being spaced from the front plane of said impact bars throughout its length.

2. A bumper comprising a rear bar, and an impact section including a plurality of vertically spaced parallel front bars extending throughout the length of the bumper and recurved to form individual end loops connected to each other and to the rear bar by integral edge-bent diagonal portions, said rear bar being spaced from the front plane of said impact bars throughout its length.

3. A bumper comprising a rear bar, and an impact section including a plurality of vertically spaced parallel front bars extending throughout the length of the bumper and recurved to form individual open end loops connected to each other and to the rear bar by diagonal members extending rearwardly from the vertical plane of the impact section to space said rear bar therefrom at the region of connection.

4. A bumper comprising a rear bar, an impact section including a plurality of vertically spaced parallel front bars extending throughout the length of the bumper and recurved to form individual end loops connected to each other and to the rear bar by diagonal members forming part of the upper and lower bars of said impact section and inclined rearwardly from the vertical plane of the impact section to space said rear bar therefrom, said rear bar being adapted for attachment to a vehicle.

5. A bumper comprising a rear bar, and an impact section including a plurality of vertically spaced parallel front bars extending throughout the length of the bumper and recurved to form individual end loops connected to each other and to the rear bar by diagonal members extending rearwardly from the vertical plane of the impact section to space said rear bar therefrom, said rear bar being adapted for attachment to a vehicle and having its middle portion extended forward toward the central portion of the impact section.

6. A bumper comprising a rear bar, and an impact section including a plurality of vertically spaced parallel front bars extending throughout the length of the bumper and recurved to form individual end loops connected to each other and to the rear bar by diagonal members extending rearwardly from the vertical plane of the impact section to space said rear bar therefrom, said rear bar being adapted for attachment to a vehicle and having its middle portion extended forward toward the central portion of the impact section and connected therewith.

7. A bumper comprising a rear bar, and an impact section including a plurality of vertically spaced parallel front bars extending throughout the length of the bumper and recurved to form individual end loops connected to each other and to the ends of the rear bar by diagonal members said front bars being also connected at a region between the ends loops.

8. A bumper comprising a rear bar, and an impact section including a plurality of vertically spaced parallel front bars extending throughout the length of the bumper and recurved to form individual end loops connected to each other and to the rear bar by diagonal members said front bars being also connected at a plurality of regions each between the center of said impact section and said end loops.

In testimony whereof, I have signed this specification.

OSCAR H. GOETZ.